US006865260B1

(12) United States Patent
Meadows et al.

(10) Patent No.: US 6,865,260 B1
(45) Date of Patent: Mar. 8, 2005

(54) SYSTEM AND METHOD FOR ELECTRONIC MESSAGE STATUS CERTIFICATION

(75) Inventors: Vernon Meadows, Lilburn, GA (US); Joseph M. Knoerle, Atlanta, GA (US); Stephen R. LaPierre, Union City, GA (US); David A. Scott, Norcross, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 283 days.

(21) Appl. No.: 09/894,542

(22) Filed: Jun. 28, 2001

(51) Int. Cl.[7] .............................................. H04M 1/64
(52) U.S. Cl. ................ 379/88.22; 379/67.1; 379/88.12; 379/88.13
(58) Field of Search ......................... 379/67.1, 70, 76, 379/84, 88.12–88.13, 88.14, 88.16, 88.17, 88.18, 88.22–88.25, 207.02, 221.08–221.12

(56) References Cited

U.S. PATENT DOCUMENTS

| | | | |
|---|---|---|---|
| 5,155,761 A | | 10/1992 | Hammond |
| 5,406,616 A | | 4/1995 | Bjorndahl |
| 5,544,229 A | * | 8/1996 | Creswell et al. ....... 379/114.05 |
| 5,784,438 A | | 7/1998 | Martinez |
| 5,793,771 A | | 8/1998 | Darland et al. |
| 6,014,427 A | * | 1/2000 | Hanson et al. ........... 379/88.18 |
| 6,014,429 A | * | 1/2000 | LaPorta et al. .......... 379/88.15 |
| 6,032,039 A | | 2/2000 | Kaplan |
| 6,173,047 B1 | | 1/2001 | Malik |
| 6,175,859 B1 | | 1/2001 | Mohler |
| 6,215,859 B1 | * | 4/2001 | Hanson .................... 379/88.22 |
| 6,233,318 B1 | * | 5/2001 | Picard et al. ............. 379/88.17 |
| 6,502,077 B1 | * | 12/2002 | Speicher ...................... 705/14 |

OTHER PUBLICATIONS

G. Vaudreuil, G. Parsons, "Voice Profile for Internet Mail," RFC2421, The Internet Society (Sep. 1998) pp. 1–39.
Arthur Rosenberg, David Zimmer, "IP Infrastructure: The Fastest Track for Tomorrow's Unified Communications," The Unified View Report (Oct. 2000) pp. 1–16, Warrington, PA, Atlantic Regional Office.

"Computerized Call Return Feature," IBM Technical Disclosure Bulletin (Apr. 1986) pp. 4897–4901.

"BellSouth Memory Call Voicemail Services," BellSouth (1999) pp. 1–3.

"Products—Impact Voice Mail Server Deluxe," Black Ice Software Inc. (1997) pp. 1–5.

R. Fajman, "An Extensible Message Format for Message Disposition Notifications," RFC2298, The Internet Society (Mar. 1998) pp. 1–21.

* cited by examiner

*Primary Examiner*—Fan Tsang
*Assistant Examiner*—Ovidio Escalante
(74) *Attorney, Agent, or Firm*—Cantor Colburn LLP (57) ABSTRACT

This invention is directed to a system and method for providing a status certification for a message in a communications network. An embodiment of this invention is a voicemail system, which provides a caller in a telecommunications network with the option of certifying a voicemail message when the recording of the message is complete. By certifying the voicemail message, the caller is indicating that the voicemail system should track any actions related to the message that occur within the voicemail system so that the caller may later access the voicemail system and ascertain the status of the message. When the caller requests certification, the voicemail system provides the caller with a means to subsequently initiate a request for the status certification. As actions are taken in relation to the message, the voicemail system creates disposition identifiers and associates these identifiers with the message. When a caller accesses the telecommunications network and requests the status certification, the voicemail determines to which message the request is directed by prompting the caller or by some other means. The system then retrieves the disposition identifiers and provides the status to the caller in a format supported by whatever access means the caller is using to make the request.

40 Claims, 5 Drawing Sheets

SYSTEM AND METHOD FOR ELECTRONIC MESSAGE STATUS CERTIFICATION

CROSS-REFERENCE TO RELATED APPLICATION

This application related to U.S. patent Ser. No. 09/894,296, filed simultaneously, entitled "System and Method for Electronic Message Status Notificaton," which is incorporated herein by reference. This application relates to U.S. patent Ser. No. 09/894,317 filed simultaneously, entitled "System and Method for Voicemail Message Certification and Reply Using A Temporary Voicemail Service," which is incorporated herein by reference. This application relates to U.S. patent Ser. No. 09/894,498, filed simultaneously, entitled "System and Method for Electronic Message Status Notification and Reply Using Various Electronic Media," which is incorporated herein by reference. This application relates to U.S. patent Ser. No. 09/894,494, filed simultaneously, entitled "System and Method for Electronic Message Reply Option Selection Notification" which is incorporated herein by reference.

NOTICE OF COPYRIGHT PROTECTION

A portion of the disclosure of this patent document and its Figures contain material subject to copyright protection. The copyright owner has no objection to the facsimile reproduction by anyone of the patent document or the patent disclosure, but otherwise reserves all copyrights whatsoever.

FIELD OF THE INVENTION

This invention generally relates to the field of electronic messaging. This invention more particularly relates to providing a status certification for a message in a communications network. An embodiment of this invention is particularly advantageous for providing status certification for a message in a voicemail system.

BACKGROUND

Electronic messaging services have become critical to the efficient operation of business. These services have also become an indispensable tool for many individuals. As the importance of electronic messaging services has grown, so has the importance of providing these services in a reliable, robust and cost-effective manner. The markets in which the service providers provide these services have also become highly competitive, and this competitive environment exerts additional pressure on the service providers to continually improve electronic messaging services. Service providers see erosion in their existing subscriber base as competitive service providers continue to make it easier and attractive to migrate to their service offerings. An inability to change service offerings to keep pace with functional requirements causes additional erosion. In order to compete effectively and increase subscriber base, a service provider must endeavor to provide the highest possible level of sought-after services while simultaneously delivering those services at a reasonable price.

Electronic messaging service providers currently provide a plurality of specialized value-added services to both business and individual users. Although the earliest true electronic messaging can be traced back to 1844 and the advent of the first practical electric telegraph system; electronic messaging now principally includes messaging via e-mail, facsimile, interactive paging and voice communications systems, both wired and wireless. However, electronic messaging is by no means limited to these mediums. For example, various video mail solutions are becoming widely available. For example, Pacific Image Communications offers a home or small-office/home-office (SOHO) product, Super Voice® Videomail, that allows the attachment of a video and audio message to a standard e-mail message. (Super Voice® is a registered trademark of Pacific Image Communications, Inc.)

Also, videophones and video conferencing are now ubiquitous in large businesses. High-speed data lines, which were until recently limited to high-cost dedicated lines, have migrated to the home in the form of digital subscriber lines (xDSL) and cable-modems. This increase in available bandwidth enables a higher level of electronic messaging service content in the home, and in combination with readily available video communications equipment will expand the demand for video-based messaging services in the home as well.

Electronic messaging services beyond the basic sending, receiving and storing of messages differ somewhat depending on the medium in which the message is being transmitted. These services include, but are most certainly not limited to, message forwarding, automatic message replies and message blocking. Despite a proliferation of available messaging services, one basic service lacking from communications is a robust and flexible means to determine the status of an electronic message once it has been received by a recipient's messaging system. Although both e-mail systems and voicemail systems do provide for limited status notification, as will be discussed below, several key requisites for a truly robust and flexible service are lacking from both sets of offerings.

Most widely available e-mail systems adhere to Internet standards as set forth in the Requests for Comment (RFC). Generally, those systems that do not specifically adhere to the Internet standards, such as those systems which adhere to the International Telecommunications Union (ITU-T) X.400 standards, provide interfaces, which in turn provide Internet standards compatibility. Adherence to the Internet standards includes providing a means of status notification to the sender in the form of a message disposition notification (MDN). As those skilled in the art are sure to recognize, disposition in this sense is not limited to a final action taken on a message but rather includes any action directed to the message after successful delivery. Although e-mail systems adhering to the standards do provide MDN, the provision is subject to a variety of limitations. RFC 2398, the draft standard for MDN, defines a Multipurpose Internet Mail Extension (MIME) content-type that a messaging system uses to report the disposition of a message after successful delivery. The standard defines disposition event types, which include, but are not limited to, displayed, dispatched, deleted, denied and mailbox-terminated events. Dispatch of a message means to send the message to a destination; dispatch includes forwarding, replying and any other act, which would result in sending the message to a destination. When any of the disposition events occurs, an e-mail system adhering to the standard sends a disposition notification message to a mailbox specified by the original sender in the header of the original message.

Voicemail services and systems function within telecommunications networks, and modern telecommunications networks adhere to a common set of industry-specific standards. However, the actual feature sets included in voicemail and other value-added services are not the subject of these standards. Instead, the service providers and their suppliers are responsible for determining the feature set that they include in a particular service. The provision of status notification in voicemail services is even more limited than in e-mail systems. One exemplary voicemail service is the BellSouth® MemoryCall® service. MemoryCall® provides status notification in the form of a confirmation that a message has been accessed. When the recipient of the voicemail message accesses the message, a confirmation message is created and stored in the voicemail box of the originating caller. The originating caller must be an existing subscriber to the MemoryCall® service, i.e., the voicemail box must be preexisting. (BellSouth® is a registered trademark of BellSouth Intellectual Property Corporation. MemoryCall® is a registered service mark of BellSouth Corporation.)

E-mail and voicemail systems are subject to a number of limitations in the provision of status messages. First, in an e-mail messaging system adhering to RFC 2398, the recipient of the status notification must be identified as an attribute in the header of the original message (Disposition-Notification-To). The attribute must specify a valid mailbox to which a status notification may be sent. In other words, the originator of the message must specify a pre-existing address to which the status notification is subsequently sent. The requirement to specify a preexisting address poses a number of problems regarding disposition notification. First, if a sender is absent from the office due to travel or other reason, the sender may be unable to gain access to the mailbox when the disposition notification is sent. A second problem arises from the transitory nature of e-mail subscribers. The sender of a message may switch e-mail service providers between the time the disposition notification was requested and the time the notification is actually sent. The subsequent notification message may be sent to a non-existing address, or even more troubling, to a mailbox belonging to someone who was not a party to the original message. An analogous problem is present in current voicemail services. As stated above, to utilize voicemail confirmation in the MemoryCall® service, the caller must be an existing subscriber of the service, i.e., the caller must have a predefined relationship with the voicemail system. Since the telecommunication service provider generally provides this type of service, this requirement limits the availability of this feature to those callers living or working within in a specific region, or perhaps, even within a specific community.

Another limitation inherent in both e-mail and voicemail services is that the creation and distribution of the status notification is based solely on the actions taken by the recipient, by the recipient's messaging system or by the administrator of the recipient's messaging system. The sender or caller cannot initiate the creation of the status notification. Often, the need for a status notification is deadline-riven; the sender or caller is interested in knowing if the message is accessed prior to a certain date. If the sender or caller receives no notification and has no means of confirming whether or not the message has been accessed by that date, then the status notification service is of no benefit to the sender or caller.

One possible solution to the reliance upon actions by the recipient has been posed in the patent to David S. Mohler, U.S. Pat. No. 6,175,859. Mohler provides for the establishment of a reply time at which the sender's or the recipient's messaging system determines whether or not the recipient has accessed the message. The subject system then creates a message denoting whether or not the message was accessed and sends the message back to the sender of the original message. However, Mohler does not provide a robust and flexible means of determining the message status. Mohler requires that the sender specify a reply time during message creation. It is not possible for the sender to check the status either multiple or varied times. Mohler also limits the destination of the reply to the origination point of the message. Mohler clearly does not address the most critical limitations of status notification as provided by current electronic messaging systems.

Another limitation of current electronic messaging systems is that only attributes of the message such as the recipient, the date created and perhaps a portion of the message to serve to identify a message in a status notification. It may be quite difficult for a sender or caller to associate the status certification with the correct message. For instance, if a sender or caller using one of these services sends a particular recipient multiple messages on the same day, it may be very difficult for the sender to determine to which message the status notification applies.

Some of the limitations on status notification apply primarily to a specific medium. For example, a limitation of current e-mail systems is that a MDN message must be sent for each disposition of the message. Depending on the requirements of the sender, many of the MDN messages provided will be at least valueless and at worst distracting and irritating. Another limitation of current e-mail MDN solutions is that the MDN message may be sent to an address in a foreign system, raising security concerns for both the sender and the recipient. For example, if a sender were to change e-mail addresses between the sending of a message requiring status notification and the actual notification, then it is possible that a third party with no association to the communication receives the status notification. It is likely that one or both of the actual parties to the communication considers the disposition notification information to be confidential and would therefore desire that no third party have access to the information.

A limitation peculiar to voicemail systems is the inability to monitor a range of event types when the recipient accesses the message. A caller may wish to know whether or not the recipient deleted a message without actually listening to it, forwarded the message to another party, or if the recipient was deleted from the voicemail system without ever having accessed the message. This information is unavailable in current voicemail services.

SUMMARY OF THE INVENTION

This invention is directed to a system and method for providing a status certification for a message in a communications network. An embodiment includes a voicemail system, which provides a caller in a telecommunications network with the option of certifying a voicemail message when the recording of the message is complete. By certifying the voicemail message, the caller is indicating that the voicemail system should track any actions related to the message that occur within the voicemail system so that the caller may later access the voicemail system and ascertain the status of the message. In response to the caller choosing to certify the message, the voicemail system provides the caller with a means to subsequently initiate a request for the status information, such as by telephone number or uniform resource locator (URL). The voicemail system stores the message, message identifiers, which may be used to identify the message and to indicate that the message requires certification, and disposition identifiers, which may be used to track disposition events described below.

The message recipient, system administrator or the voicemail system itself may perform actions that affect the status of the message. The actions may include, but are not limited to, accessing the message, deleting the message without listening to it, forwarding the message, and deleting the recipient from the voicemail system. When any of these actions take place, the system stores additional data elements, herein referred to as disposition identifiers, with the message. The status of a message at any point in time may be ascertained by compiling the message and disposition identifiers that the voicemail system has associated with the message.

At some point in time, the original caller uses the available access means to access the telecommunications network and determine the status of the voicemail message. The caller may request the status multiple times. For example, the caller may use a cell phone to dial an access number and check the status. Subsequently, the caller may use a personal digital assistant (PDA) to access the Internet and check the status. When the voicemail system receives a request for status information, the system determines to which message the status request refers, compiles all of the message and disposition identifiers for the message into a status message, and provides the status message to the requestor in a form which is compatible with the access means the requestor is using. For example, if the requestor is accessing the voicemail system via a telephone call, the status is conveyed in the form of an audio message, and if the requester is accessing the voicemail system via a PDA, the status is conveyed via a text message.

An embodiment of this invention provides numerous advantages over current electronic messaging systems. First, because the sender may utilize various access means to obtain the message certification, the sender is not required to have access to the communications client used in creating the message. Also, the potential for sending the message to a third party by mistake, which exists in current systems, is reduced, if not eliminated by an embodiment of this invention.

Another advantage of an embodiment of this invention is that the availability of the status information is not dependent on actions taken by the recipient. The sender is able to take action to determine the status of a particular message. It is often the case that knowledge regarding the disposition of a message is date and time dependent. Therefore, it is highly advantageous for the sender of the message to have the ability to determine the status of the message when he or she chooses. Also, in an embodiment of this invention, a separate message is not sent out for each disposition event. An embodiment of the invention compiles the identifiers into a single status message that is provided to the sender upon request.

An embodiment of this invention as a voicemail service provides further advantages over current voicemail offerings. Current voicemail services simply store confirmation that a message was accessed in an existing subscriber's voicemail box. An embodiment of this invention allows subscribers and non-subscribers alike to access message status information without a voicemail box. Also, an embodiment of this invention tracks multiple disposition events, providing the requestor with much more information than is available in current voicemail services.

Further details and advantages of this invention are set forth below.

BRIEF DESCRIPTION OF THE FIGURES

These and other features, aspects, and advantages of this invention are better understood when the following Detailed Description of the Invention is read with reference to the accompanying drawings, wherein.

DETAILED DESCRIPTION OF THE INVENTION

As described above, this invention provides a system and method for providing a status certification for a message in a communications network. An embodiment of this invention includes a processor to assign a message identifier for the message, create a disposition identifier in response to a disposition event, and associate the disposition identifier with the message. The processor also receives a request for a status notification, and in response, compiles the message and disposition identifiers to generate the status notification and provides the status notification.

As technology advances, the capabilities of disparate communications networks begin to overlap. For example, previous text-only e-mail systems now generally support graphics, as well as audio and video formats. In an embodiment of this invention, the communications network includes at least one of: an electronic communications network, a text-based communications network, a telecommunications network, a video-enabled communications network, and/or a multimedia-enabled communications network.

As described above, an embodiment of this invention creates disposition identifiers in response to disposition events. A disposition event includes at least one of: a managing event and/or a dispatching event. A managing event includes management of the message, the messaging system and the identifiers associated with the message. A managing event includes at least one of: accessing the message, deleting the message, presenting an indication of the message, expiring the message, terminating a recipient of the message from the communications network, denying the status certification for the message, and/or a malfunctioning of the status certification for the message. An indication of the message is anything that brings the message's presence in the messaging system to the attention of the recipient. The recipient may or may not act on the message when the recipient receives the indication. For example, a messaging system indicates that two messages exist, but that only one is urgent. If the recipient accesses only the urgent message, the recipient has received indication of both messages, but only accessed one. Expiring the message refers to the deleting or inactivating of a message after a designated period of time. A dispatching of the message is any act that causes the original message to be sent to an address, such as forwarding the message and/or replying to the message.

An embodiment of this invention creates a status notification by compiling the message and disposition identifiers associated with a message. The system provides the status notification in response to a request. The request may be a secure request and may be initiated by various network access devices, including at least one of: a telephone, a television, a cellular-capable device, a personal digital assistant, and a computer. The system creates a status notification in a format, which corresponds to the capabilities of the network access device, including at least one of: an audio message, a video message, a text message, a short message service message, and a markup language document. Short message service provides the ability to send a short alphanumeric message (160 characters) to a mobile phone operating in a Global System for Mobile Communications (GSM) network. A markup language format includes documents created using subsets of the structured general markup language (SGML), such as hypertext markup language (HTML), extensible markup language (XML) and video XML.

For a messaging system to successfully track messages as they move into and out of the system, the system must associate identifying information with the messages. An embodiment of this invention associates message identifiers with a message to facilitate tracking of the message. Message identifiers are discreet data elements describing the message. The message identifiers distinctly identify an individual message and its contents and also identify information contained in the header of the message, such as the source and destination of the message, the communication network within or across which a message has traversed, the parties to the message, and the dates and times at which certain message related events occur. Message identifiers, which describe the contents of the message, include at least one of: a type identifier, an alphanumeric identifier, a capabilities identifier and/or an annotation. A type identifier includes information regarding the format of the message, such as text, rich text format (RTF) or HTML. An alphanumeric identifier is an identifier consisting of both alphabetic and numeric symbols. In an embodiment of this invention, the alphanumeric identifier is a unique code assigned to each message within the messaging system. A capabilities identifier describes the media capabilities required to successfully present the message. For example, if the message contains a video clip, the messaging system must include or have access to a video media player to successfully present the message. An annotation allows the originator of a message to later identify the message. For example, a caller might record a brief audio annotation such as "lunch on May 1$^{st}$" with a message to more easily identify the original message when the caller receives a subsequent status notification.

In an embodiment of this invention, message identifiers that describe the header information contained in the message include at least one of: a communication network identifier, a device identifier, a role identifier, a party identifier, a date identifier and/or a time identifier. A communications network identifier describes the type of network the message traversed as well as identifying various components of the network. For example, if an e-mail message originates on the Internet, the IP address associated with either the simple mail transfer protocol (SMTP) or post office protocol (POP) server is associated with the message.

A device identifier describes the type of device used in a communication, identifies an actual device, and/or describes a device's capabilities with respect to voice, text and multimedia. For example, in one embodiment of this invention, the device on which the message originates is a computer on the Internet. If the computer has a static IP address, the system associates the IP address as a device identifier with the message. In an embodiment of this invention as a voicemail system, the system associates the dialing number of the originator as a device identifier with the message.

Identification of the parties to a communication is a critical requirement in any communications system, electronic or otherwise. A role identifier describes a role that a party plays in a communication, and a party identifier describes a party to the communication. Depending on the communication type, a party may participate in at least one of a number of roles, including, but certainly not limited to, originator, sender, caller, recipient, and/or system administrator. A party identifier, which identifies a party, includes at least one of: an email address, an access address, a voice sample, and an image. The applicable type of party identifier varies depending on the type of message and communications network. For example, in an embodiment of this invention as a voicemail system, a voice sample identifies a party to the message. An access address includes any address from which or to which the message is directed. For example, in an embodiment of this invention as a voicemail system, a caller leaves a message in the system, and the system stores the caller's dialing number as the access address.

Date and time identifiers provide the capability to track when events occur. For example, date and time identifiers are associated with messages to indicate when the message is sent, received and/or dispatched. Date and time identifiers are also associated with other events, such as the disposition events that are described below, to indicate when these events occur.

Blling for services is a necessity for any communications service provider. An embodiment of this invention bills a party to the message for providing a status certification for a message. Various embodiments of billing are possible. One embodiment bills the originator of the message when the originator requests a status certification. Another embodiment bills the recipient a flat monthly charge for making the service available for communications directed to the recipient.

In an embodiment of this invention, the messaging system processor includes a central processing unit as well as read-only memory (ROM) and random access memory (RAM). The system stores the attributes for the certification in the processor's RAM. Storing the attributes in this manner ensures fast retrieval times. The attributes include at least one of: the message identifier, the disposition identifier and the status notification. An alternative embodiment of this invention includes a data repository to store the attributes. The data repository provides somewhat slower data access but improves stability and recoverability of the system. In one embodiment of this invention, the data repository includes a single database. In another embodiment, the system includes multiple databases, a first database for storing the message, and a second for storing the attributes associated with a message.

An embodiment of this invention also provides administrative functions, including, but not limited to, deleting, monitoring, moving, forwarding, securing, archiving and backing up the attributes. These functions allow the administrator to effectively manage the resource requirements on the messaging system relative to the status certification requests. An embodiment of this invention also provides administrative functionality to the recipient of a message, including informing a recipient of an attribute or a message and blocking an attribute of a message.

Figure 1:
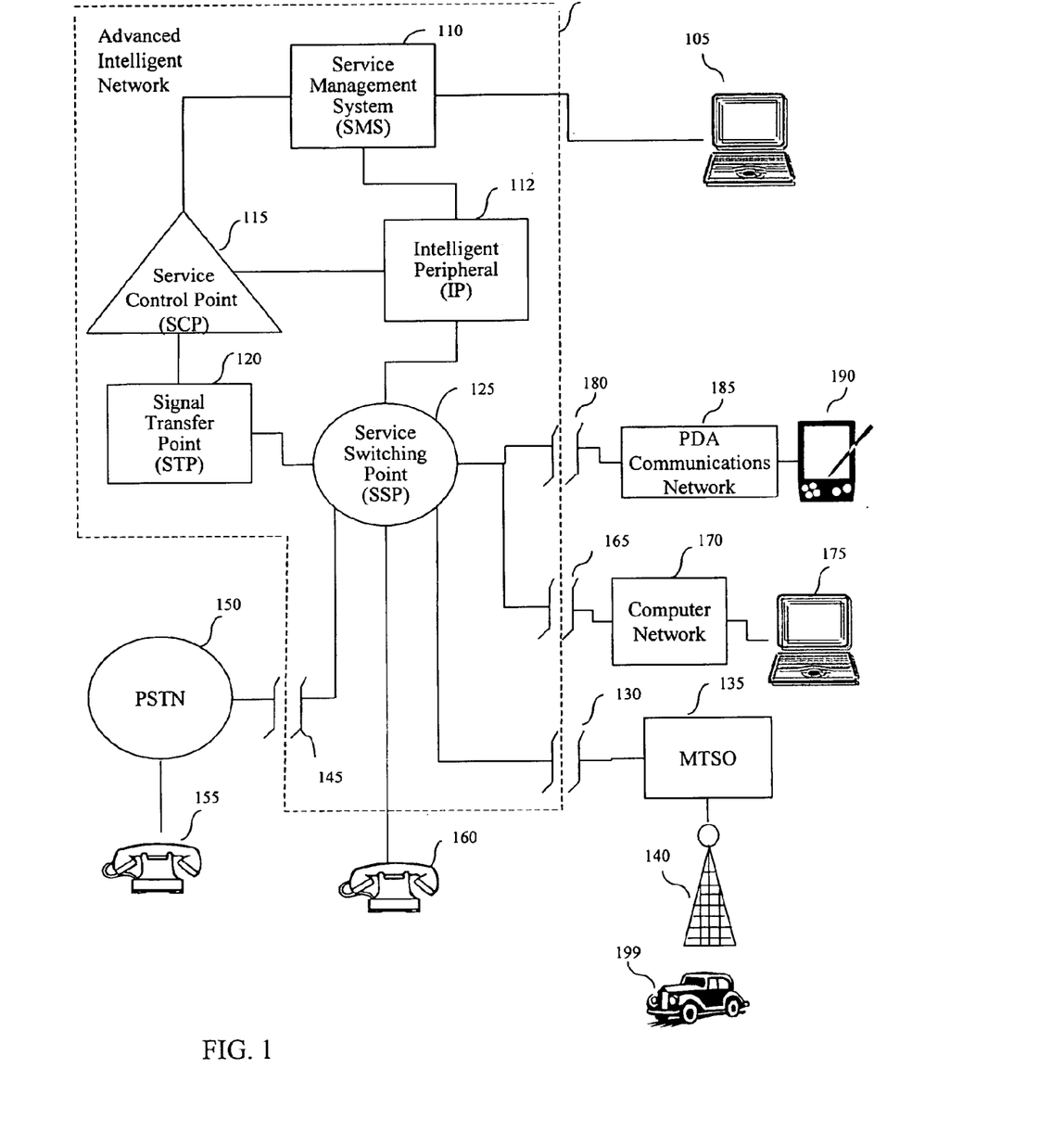
FIG. 1 is a diagram of an exemplary embodiment and an exemplary environment for operation of this invention.

As illustrated in FIG. 1, this invention is advantageously embodied as a system in an AIN 101, which provides advanced services such as voicemail. As is known to those skilled in the art, an AIN includes a plurality of hardware and software elements operating over industry standard communication protocols, including signaling system 7 (SS7). For the sake of brevity, only a basic description of the AIN is provided herein. For further information regarding aspects of the AIN, refer to Weisser, U.S. Pat. No. 5,430,719, which is incorporated herein by reference.

In an embodiment of this invention, the status certification functionality of this invention is implemented via an intelligent peripheral (IP) 112. An intelligent peripheral executes service logic programs or other similar software to provide advanced services in an AIN. An intelligent peripheral also includes dual-tone multi-frequency (DTMF) and voice recognition as well as voice synthesis capabilities.

A call is placed on a telephone 160 that is functionally connected to a service switching point (SSP) 125. An SSP is a central office switch that provides intelligent network functionality. Once the SSP collects the dialed digits, the SSP generates a trigger. A trigger generates a packet that is sent to a service control point (SCP) 115 through a signal transfer point (STP) 120, causing the SCP to query its database to determine whether to provide conventional telephone service or an enhanced service for the call. Signal transfer points are packet switching systems that can route and concentrate messages exchanged between service control points and service switching points. A service control point includes computer processors, application software and databases that control the setup, monitoring and termination of phone calls.

The SSP pauses as the trigger is routed through the STP 120 to the SCP 115. The SCP 115 looks up the record for the dialed number and determines that the calling line is busy and that the subscriber is also a subscriber to a voicemail service. The SCP sends packets back to the SSP via the STP 120. The SSP 125 establishes a voice and data link to the IP 112. The IP accepts the voicemail message and provides the caller with audio instructions regarding establishing a status certification. The IP receives the status certification information from the caller via DTMF recognition or voice recognition and stores the information, message and status identifiers, in a database in the IP. The IP also provides the caller with various means of later initiating a request for the status notification. The caller terminates the call and the system releases all data and voice resources.

As is clear to one skilled in the art, multiple embodiments of this invention are possible. This invention may be embodied as a system in an advanced intelligent network (AIN), as a system including no AIN components or as a system which combines aspects both inside an outside an AIN. For example, the forwarding of a call to an intelligent peripheral may be a purely switch-based "call forward no answer" or "call forward busy."

When the message recipient listens to the voicemail message, the IP 112 stores a disposition identifier with the message. As additional disposition events occur, the IP associates additional disposition identifiers with the message.

In an embodiment of this invention, the SSP 125 receives the communication directed to the status certification. In response to the communication, the SSP pauses in processing the call and issues a query to the SCP 115 via the STP 120, requesting instructions regarding the handling of the communication, and the SCP directs the SSP to establish a link to the IP. Once this link is established, the IP may send a conversation message to the SSP, instructing the SSP to play an announcement requiring the requester to identify the voicemail message to which the identifiers have been associated. Alternatively, the IP may be able to identify the message based on an attribute associated with the requester, such as the dialing number from which the request originated. The IP compiles the identifiers to create the status notification and provides the status notification to the SSP for presentation to the requester.

SSP 125 also provides an interface between the AIN and termination points, such as an interface 130, 145, 165, 180. An interface, such as a router, gateway or other similar device, acts as a protocol converter between disparate networks.

The requestor initiates the request via a network access device (NAD) 135, 160, 175, 190, 199. The NAD is functionally connected to the SSP 125 and is operative both to allow the requestor to initiate the communication requesting the status notification and to render the status notification. The status notification may take at least one of many forms, depending on the capabilities of the NAD. The NAD includes at least one of: a telephone 160, 135, a cellular-capable device 199, a personal digital assistant (PDA) 190 and/or a computer 175. The NAD may be connected directly to the SSP or may exist in a network, which is connected to the SSP via one or more of the afore mentioned interfaces.

In an embodiment of this invention, a mobile telephone switching office (MTSO) 135 is functionally connected to an interface 130, which is functionally connected to the SSP 125. The MTSO facilitates access of a cellular-capable device 199 to the AIN 101 and reception of the status notification. Another embodiment of this invention also includes a computer network 170, which is functionally connected to an interface 165 and provides direct link or common web-based access to the AIN and further facilitates requesting and rendering the status notification via a computer network client device 175. As is obvious to one skilled in the art, various other interfaces, external networks, such as the public switched telephone network 150, and access devices, such as a personal digital assistant 190, provide access to the AIN.

An embodiment of this invention also includes administrative functionality. The administrative functionality is necessary for the convenience of the recipient and for the efficient management of the AIN 101. In an embodiment, the IP 112 is further operative to delete the identifiers, based on actions by the recipient, by the system administrator, or automatically based on variables such as the passage of time. An embodiment also includes functionality for the recipient of a voicemail message to provide flexibility and privacy in the recipient's use of the voicemail service. The IP is further operative to inform a recipient of a request for status certification. Also, the IP is operative to allow a recipient to block a status certification on a particular message or to block status certification on all messages directed to the recipient.

An embodiment of this invention also includes further administrative functionality implemented through the use of another AIN element, a service management system (SMS). A SMS is an element designed to provide management and reporting capabilities to an AIN, such as managing software, service data and subscriber data updates and generating subscriber service reports. Referring again to FIG. 1, SMS 110 is functionally connected to IP 112 and SCP 115 and is operative to monitor the identifiers. The monitoring functionality includes subscriber service reports and broader system management reports as identified by an administrator of the system. A terminal 105 provides access to present a graphical user interface to a system administrator or other user with access to the AIN. The graphical user interface provides administrative functionality, such as displaying the identifier monitoring reports.

Figure 2:
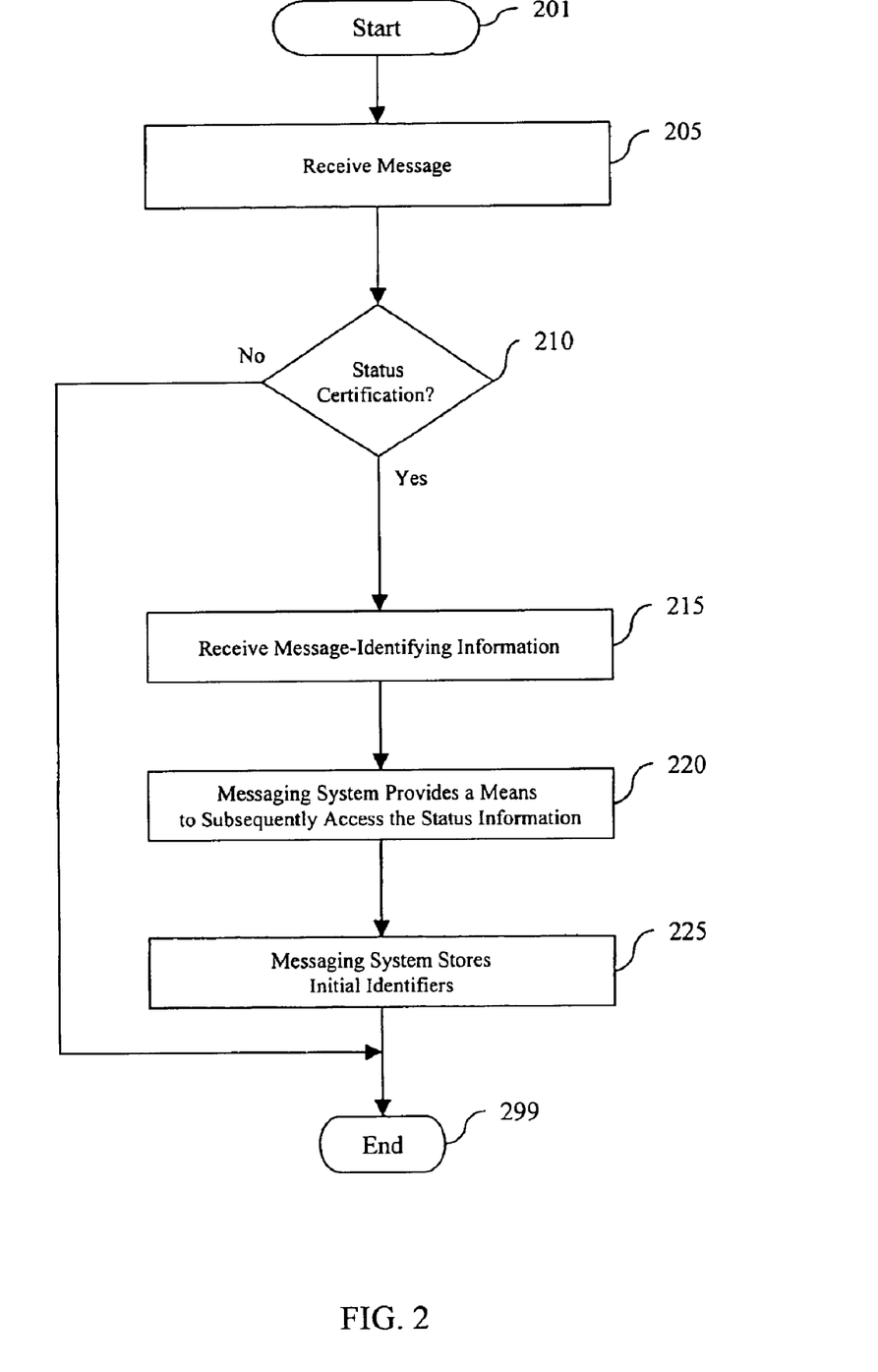
FIG. 2 is a flowchart illustrating an exemplary method for requesting status certification for a message in an embodiment of this invention.
Figure 3:
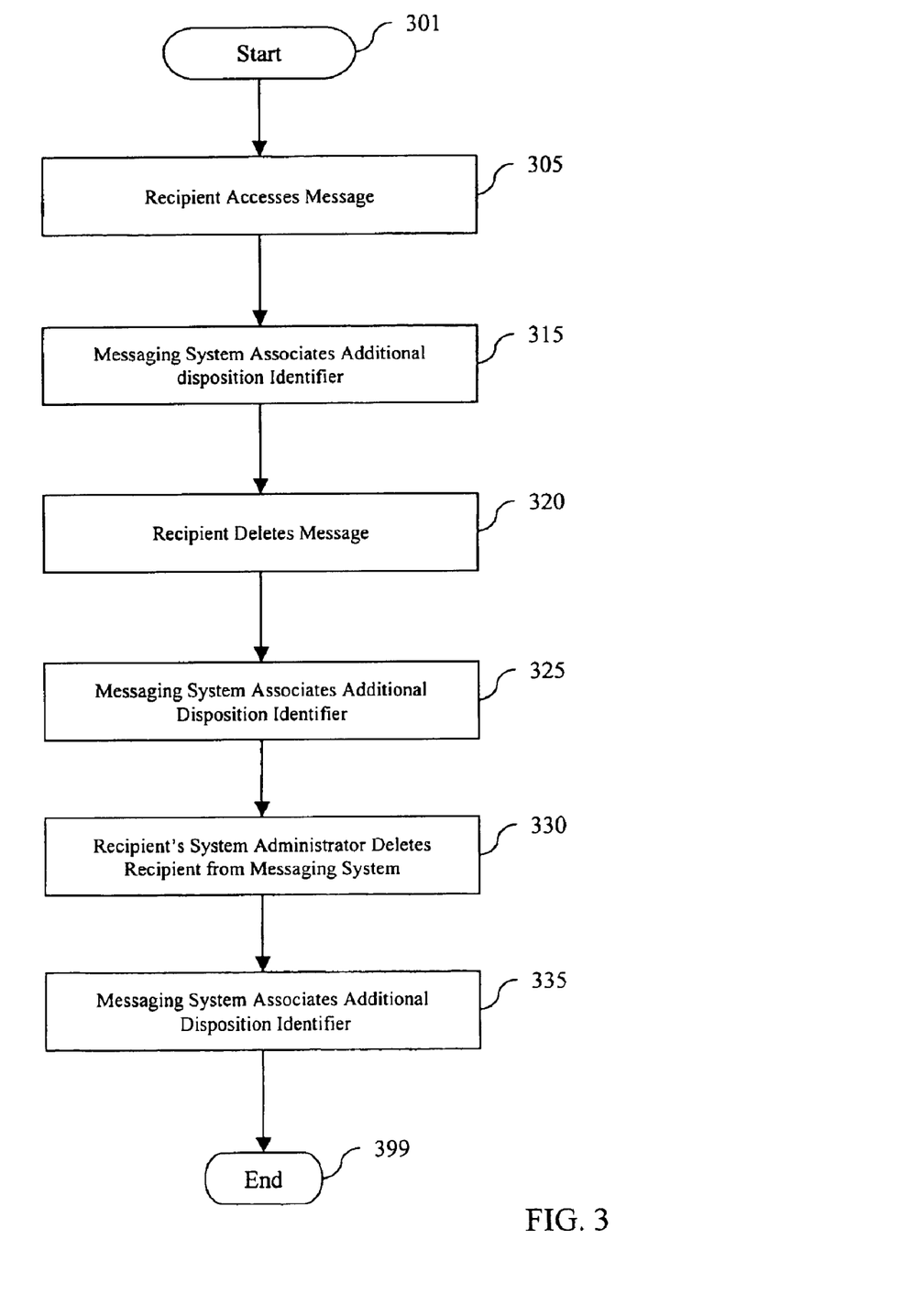
FIG. 3 is a flowchart illustrating an exemplary method for associating identifiers with a message in an embodiment of this invention.
Figure 4:
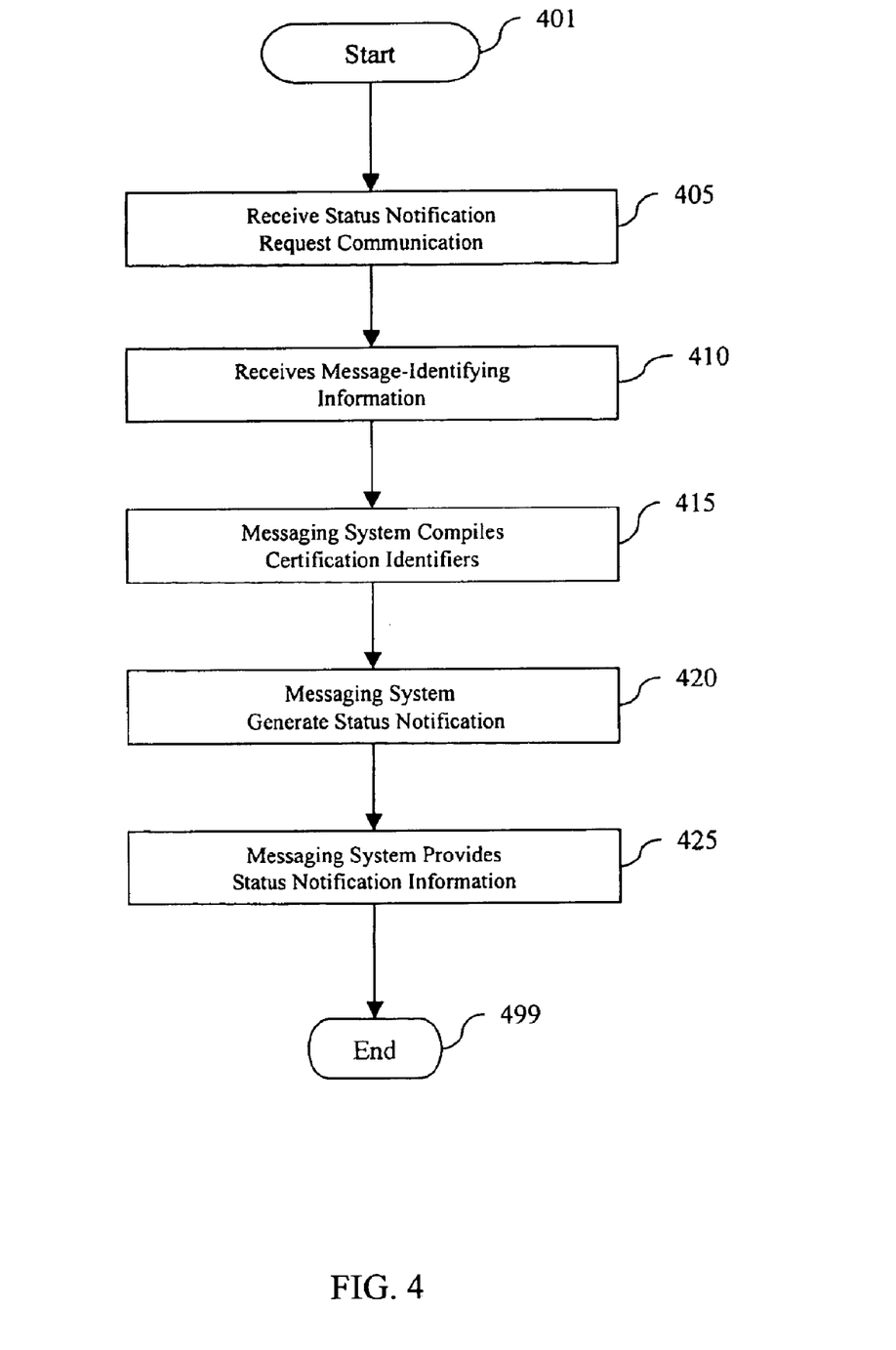
FIG. 4 is a flowchart illustrating an exemplary method for associating identifiers with a message and providing the status certification in an embodiment of this invention.

In an embodiment of this invention, at least three discreet processes occur. First, an originator of a message creates a message and indicates a desire for a status certification. Second, the recipient's messaging system maintains the identifiers necessary to provide the status certification. Third, the recipient's messaging system receives a request for a status notification and, in response, provides the status notification. FIGS. 2, 3 and 4 provide a more detailed illustration of an embodiment of the steps carried out in accordance with this invention.

Referring to FIG. 2, the messaging system receives a message 205. The system provides the originator of the message with the option of enabling status certification of the message 210. In an embodiment of this invention as an e-mail system, the certification option may be one of several options available when sending a message. In an embodiment of this invention as a voicemail system, the certification option may be provided at the conclusion of the recording of the voicemail message. Referring again to FIG. 2, if the sender chooses to forgo status certification, the sender exits the messaging system and the process ends 299. If instead the sender decides to add status certification, the sender specifies message-identifying information, such as a voice annotation 215. The system then provides the sender with a means of later accessing the certification information 220. For example, the means for accessing the certification information may be a uniform resource locator (URL), directing the user to a web-based access interface to the recipient's messaging system. Alternatively, the access means may be a telephone number. At this point, the recipient's messaging system associates an initial set of identifiers with the message 225. These identifiers include data about the sender, the recipient, the date and time of the call and any other data regarding the message. Once the system has associated the identifiers with the message, the process is complete 299.

Once an originator has requested certification for a message, the recipient's messaging system associates disposition identifiers with the message whenever a status change occurs. Referring to FIG. 3, the recipient accesses the message 305 that has been certified, and in response, the recipient's messaging system associates an additional disposition identifier with the message 315. Subsequently, the recipient deletes the message 320. Once again, the messaging system associates a disposition identifier with the message 325. Additionally, the status of the message changes due to the actions of others with access to the message and messaging system, such as the recipient's messaging system administrator. For instance, the system administrator deletes the recipient from the messaging system 330. The messaging system stores an additional disposition identifier, noting this change 335. The messaging system stores additional identifiers as the result of various other events, such as forwarding and replying to the message.

At any point in time, and possibly at many points in time, the originator may initiate a request for the current status of the message. Someone other than the originator of the message may initiate the request. The initiator may be another caller with whom the original caller has shared the access means or, depending on the access means, even an automated system may initiate the request. Referring to FIG. 4, the recipient's messaging system receives the communication requesting the status notification 405. The message is identified in the communication 410. The voicemail system then compiles the identifiers 415 and generates a status notification 420. After generation of the status notification is complete, the voicemail system provides the report to the initiator of the communication via a means supported by the communication channel by which the request for status certification was initiated 425. For example, if the communication is by telephone, then the provisioning of the status notification is by an audio means. Alternatively, if the communication is initiated via a secure web site, the provisioning is in the form of an HTML page with a text message or in the form of an audio attachment to an e-mail message. An example of an audio attachment is a wave file, a sound format initially developed by Microsoft Corporation and now accessible on many operating systems.

Figure 5:
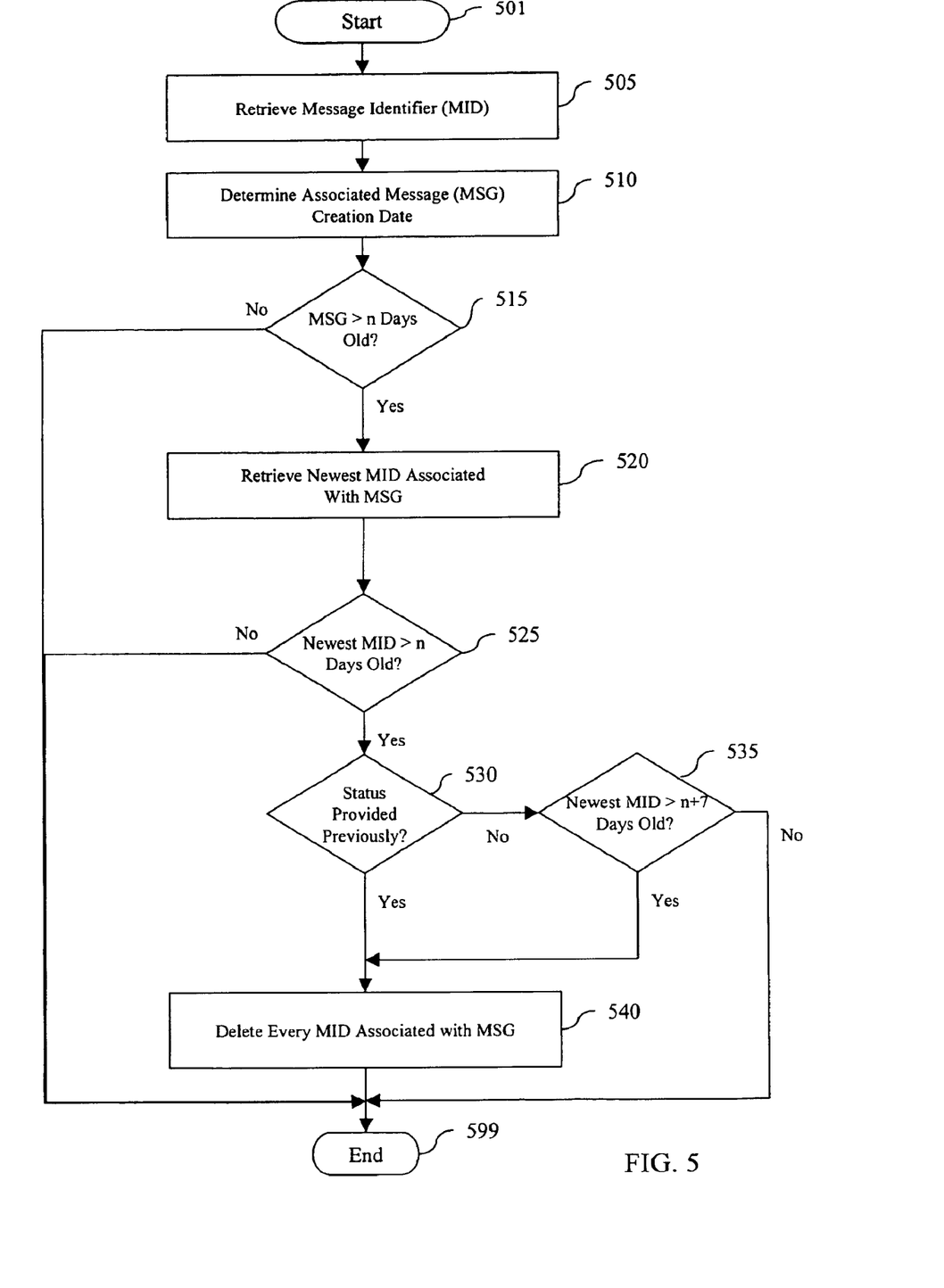
FIG. 5 is a flowchart illustrating an exemplary method for deleting an identifier after the passage of time in an embodiment of this invention.

An embodiment of this invention also provides administrative functionality. To ensure the efficient use of resources, an embodiment of this invention may delete, archive or otherwise transfer or dispose of the identifiers associated with a message. For example, in an embodiment of this invention, a system administrator identifies triggering events for the deletion of identifiers such as after a status notification has been communicated or after the passage of a specified period of time. In one embodiment of this invention an automated process as illustrated in FIG. 5 deletes the identifiers after the passage of time. A system administrator specifies the number of days after which a set of identifiers is stale and can therefore be deleted from the system.

Referring to FIG. 5, the embodiment of the steps of this invention begins with the retrieval a message identifier (MID) 505. Once the MID has been retrieved, the at system identifies the message with which the MID is associated 510. By examining the attributes of the message, including the date it was created, the system determines whether the age of the message is greater than a specified number of days (n) 515. The system administrator specifies the value of n prior to the beginning of this process, such as during the configuration of the messaging system. If the message is greater than n days old, the system retrieves the newest MID associated with the message 520; if the message is less than or equal to n days old, the process ends 599. The newest MID is the MID associated with the most recent disposition event related to the message.

The system determines whether the newest MID is greater than n days old 525. If so, the system determines whether or not provision of a status notification has occurred 530. If so, every MID associated with the message is deleted from the system 540. If the system has not provided a status notification, the system next performs a further check to determine whether the newest MID is greater than n+7 days old or some other period as defined by the system administrator or user 535. If so, every MID associated with the message is deleted from the system 540. This process is repeated for each remaining MID in the system.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of this invention.

That which is claimed:

1. A method for providing a status certification for a message in a communications network, the communications network including a messaging system, the messaging system performing a method, comprising:
   receiving said messages and assigning a message identifier to said message at the messaging system, the message generated by a sender and distributed to a recipient of the message, wherein the recipient is a subscriber to a messaging service provided by the messaging system;
   creating a first disposition identifier in response to a first disposition event, the disposition event including at least one of a managing event and a dispatching event;
   associating said first disposition identifier with said message;
   receiving a request for a status notification of said message from the sender said message, the sender being a non-subscriber of the messaging service;
   compiling said message identifier and said first disposition identifier to generate a first status notification; and
   providing said first status notification to said sender in response to said request;
   creating a second disposition identifier in response to a second disposition event occurring subsequent to said first disposition event, the second disposition event including at least one of a managing event and a dispatching event;
   associating said second disposition identifier with said message;
   compiling said message identifier and said second disposition identifier to generate a second status notification; and
   providing said second status notification to said sender.

2. The method of claim 1, further comprising:
   billing a party to said message for said providing of said status certification.

3. The method of claim 1, wherein said first and second disposition events are initiated by at least one of the recipient, a messaging system administrator, and an automated event executed by the messaging system.

4. The method of claim 3, wherein said managing event comprises at least one of:
   accessing said message;
   deleting said message;
   presenting an indication of said message;
   expiring said message; and
   terminating a recipient of said message from said communications network.

5. The method of claim 3, wherein said managing event comprises at least one of:
   denying said status certification of said message; and
   malfunctioning of said status certification of said message.

6. The method of claim 3, wherein said dispatching event comprises at least one of:
   forwarding said message; and
   replying to said message.

7. The method of claim 1, wherein said status notification comprises at least one of:
   an audio message:
   a video message;
   a text message;
   a short message service message; and
   a markup language document.

8. The method of claim 1, wherein said communications network comprises at least one of;
   an electronic communications network;
   a text-based communications network;
   a telecommunications network;
   a video-enabled communications network; and
   a multimedia-enabled communications network.

9. The method of claim 1, wherein said message identifier comprises at least one of:
   a type identifier;
   an alphanumeric identifier;
   a capabilities identifier; and
   an annotation.

10. The method of claim 1, wherein said message identifier comprises at least one of:
    a communication network identifier;
    a device identifier;
    a role identifier;
    a party identifier;
    a date identifier; and
    a time identifier.

11. The method of claim 10, wherein said role identifier comprises at least one of:
    an originator;
    a sender;
    a caller;
    a recipient; and
    a system administrator.

12. The method of claim 10, wherein said party identifier comprises at least one of:
    an email address;
    an access address;
    a voice sample; and
    an image.

13. The method of claim 1, further comprising storing an attribute for said status certification for said message, wherein said attribute comprises at least one of:
    said message identifier;
    said first or second disposition identifier; and
    said first or second status notification.

14. The method of claim 13, further comprising administrative functionality, wherein said administrative functionality comprises at least one of;
    deleting said attributes;
    monitoring, said attributes;
    moving said attribute;
    forwarding said attribute;
    securing said attribute;
    archiving said attribute;
    backing up said attribute;
    informing a recipient of said attribute; and
    blocking said attribute.

15. The method in claim 1, wherein said request comprises a secure request.

16. The method in claim 1, wherein said request comprises dialing an access number.

17. The method in claim 1, wherein said request comprises a hypertext transfer protocol request (HTTP) directed to a uniform resource locator address (URL).

18. A system for providing a status certification for a message in a communications network comprising:
- a messaging system including a processor operative to receive the message and assign a message identifier to said message at the messaging system, the message generated by a sender and distributed to a recipient of the message, wherein the recipient is subscribed to a messaging service provided by the messaging system;
- said processor further operative to create a first disposition identifier in response to a first disposition event, the first disposition event including at least one of a managing event and a dispatching event;
- said processor further operative to associate said first disposition identifier with said message;
- said processor further operative to receive a request for a status notification from the sender, the sender being a non-subscriber of the messaging service;
- said processor further operative to compile said message identifier and said first disposition identifier to generate a first status notification; and
- said processor further operative to provide said first status notification to said sender in response to said request;
- said processor further operative to create a second disposition identifier in response to a second disposition event occurring subsequent to said first disposition event, the second disposition event including at least one of a managing event and a dispatching event;
- said processor further operative to associate said second disposition identifier with said message;
- said processor further operative to compile said message identifier and said second disposition identifier to generate a second status notification; and
- said processor further operative to provide said second status notification to said sender.

19. The system of claim 18, wherein said processor is further operative to:
- bill a party to said message for said providing of said status certification.

20. The system of claim 18, wherein said first and second disposition events are initiated by at least one of the recipient, a messaging system administrator, and an automated event executed by the messaging system.

21. The system of claim 20, wherein said managing event comprises at least one of:
- accessing said message;
- deleting said message;
- presenting an indication of said message;
- expiring said message; and
- terminating a recipient of said message from said communications network.

22. The system of claim 20, wherein said managing event comprises at least one of:
- denying said status certification of said message; and
- malfunctioning of said status certification of said message.

23. The system of claim 20, wherein said dispatching event comprises at least one of:
- forwarding said message; and
- replying to said message.

24. The system of claim 18, wherein said status notification comprises at least one of:
- an audio message;
- a video message;
- a text message;
- a short message service message; and
- a markup language document.

25. The system of claim 18, wherein said communications network comprises at least one of:
- an electronic communications network;
- a text-based communications network;
- a telecommunications network;
- a video-enabled communications network; and
- a multimedia-enabled communications network.

26. The system of claim 18, wherein said message identifier comprises at least one of:
- a type identifier;
- an alphanumeric identifier;
- a capabilities identifier; and
- an annotation.

27. The system of claim 18, wherein said message identifier comprises at least one of:
- a communication network identifier;
- a device identifier;
- a role identifier;
- a party identifier;
- a date identifier; and
- a time identifier.

28. The system of claim 27, wherein said role identifier comprises at least one of;
- an originator;
- a sender;
- a caller;
- a recipient; and
- a system administrator.

29. The system of claim 27, wherein said party identifier comprises at least one of:
- an email address;
- an access address;
- a voice sample; and
- an image.

30. The system of claim 18, wherein said processor is further operative to store an attribute for said status certification for said message, wherein said attribute comprises at least one of:
- said message identifier;
- said first or second disposition identifier; and
- said first or second status notification.

31. The system of claim 30, wherein said processor is further operative to perform administrative functionality, wherein said administrative functionality comprises at least one of:
- deleting said attribute;
- monitoring said attribute;
- moving said attribute;
- forward ing said attribute;
- securing said attribute;
- archiving said attribute;
- backing up said attribute;
- informing a recipient of said attribute; and
- blocking said attribute.

32. The system in claim 18, further comprising a data repository for storing at least one of
- said message, said message identifier,
said first or second disposition identifier, and
said report.

33. The system in claim 32, wherein said data repository comprises a database.

34. The system in claim 32, wherein said data repository comprises:
a first database for storing said message; and
a second database for storing said attribute.

35. The system in claim 18, wherein said request is a secure request.

36. The system in claim 18, further comprising a network access device to issue said request, wherein said network access device comprises at least one of:
a telephone;
a television;
a cellular-capable device;
a personal digital assistant; and
a computer.

37. The system of claim 18, wherein said processor is within an intelligent peripheral and said network is an advanced intelligence network (AIN).

38. The system in claim 37, further comprising:
a service switching point functionally connected to said intelligent peripheral; and
an interface functionally connected to said service switching point and operative to accept a communication directed to said AIN.

39. The system in claim 38, further comprising a mobile telephone switching office (MTSO) functionally connected to said interface and operative to facilitate a cellular device communication directed to said AIN.

40. The system in claim 38, further comprising a computer network functionally connected to said interface and operative to facilitate a computer-based communication directed to said AIN.

* * * * *